United States Patent
Lange et al.

(10) Patent No.: US 12,284,157 B1
(45) Date of Patent: Apr. 22, 2025

(54) GRANULAR SECURITY SEGMENTATION FOR COMPUTING ASSETS

(71) Applicant: Morgan Stanley Services Group Inc., New York, NY (US)

(72) Inventors: Nicholas James Lange, New York, NY (US); Song Cong Siao, New York, NY (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/938,972

(22) Filed: Nov. 6, 2024

(51) Int. Cl.
*H04L 9/40* (2022.01)

(52) U.S. Cl.
CPC ...... *H04L 63/0227* (2013.01); *H04L 63/0263* (2013.01)

(58) Field of Classification Search
CPC .................. H04L 63/0227; H04L 63/0263
See application file for complete search history.

(56) References Cited

U.S. PATENT DOCUMENTS

| | | | |
|---|---|---|---|
| 6,219,786 B1 | 4/2001 | Cunningham et al. | |
| 7,991,899 B2 | 8/2011 | Schmidt | |
| 9,069,958 B2 | 6/2015 | Beauvais et al. | |
| 11,218,508 B2 | 1/2022 | Dixit et al. | |
| 2006/0190984 A1 | 8/2006 | Heard et al. | |
| 2009/0307753 A1 | 12/2009 | Dupont et al. | |
| 2012/0117615 A1 | 5/2012 | Mackinnon et al. | |
| 2015/0269383 A1 | 9/2015 | Lang et al. | |
| 2016/0057213 A1 | 2/2016 | Greenbaum et al. | |
| 2016/0344773 A1 | 11/2016 | Knjazihhin et al. | |
| 2017/0250915 A1* | 8/2017 | Long, III | H04L 41/0894 |
| 2018/0343236 A1* | 11/2018 | Pillay-Esnault | H04L 63/20 |
| 2020/0177638 A1 | 6/2020 | Salman et al. | |

* cited by examiner

*Primary Examiner* — Huan V Doan
(74) *Attorney, Agent, or Firm* — Duane Morris LLP

(57) ABSTRACT

A method of dynamically managing network traffic with granular security zones is disclosed. The method includes receiving a data packet from a user device, the data packet including identifying information indicating a sender and a receiver. The method further includes blocking the data packet from reaching the receiver. The method still further includes mapping, in response to the blocking, the identifying information to entity information and asset information for the sender, and entity information and asset information for the receiver. The method yet further includes matching the entity information with an entity permission of one or more entity permissions, each entity permission indicating that a specific source asset associated with a specific entity can or cannot communicate with a specific target asset associated with a specific entity. The method still further includes updating one or more packet filter rules based on the matching.

20 Claims, 10 Drawing Sheets

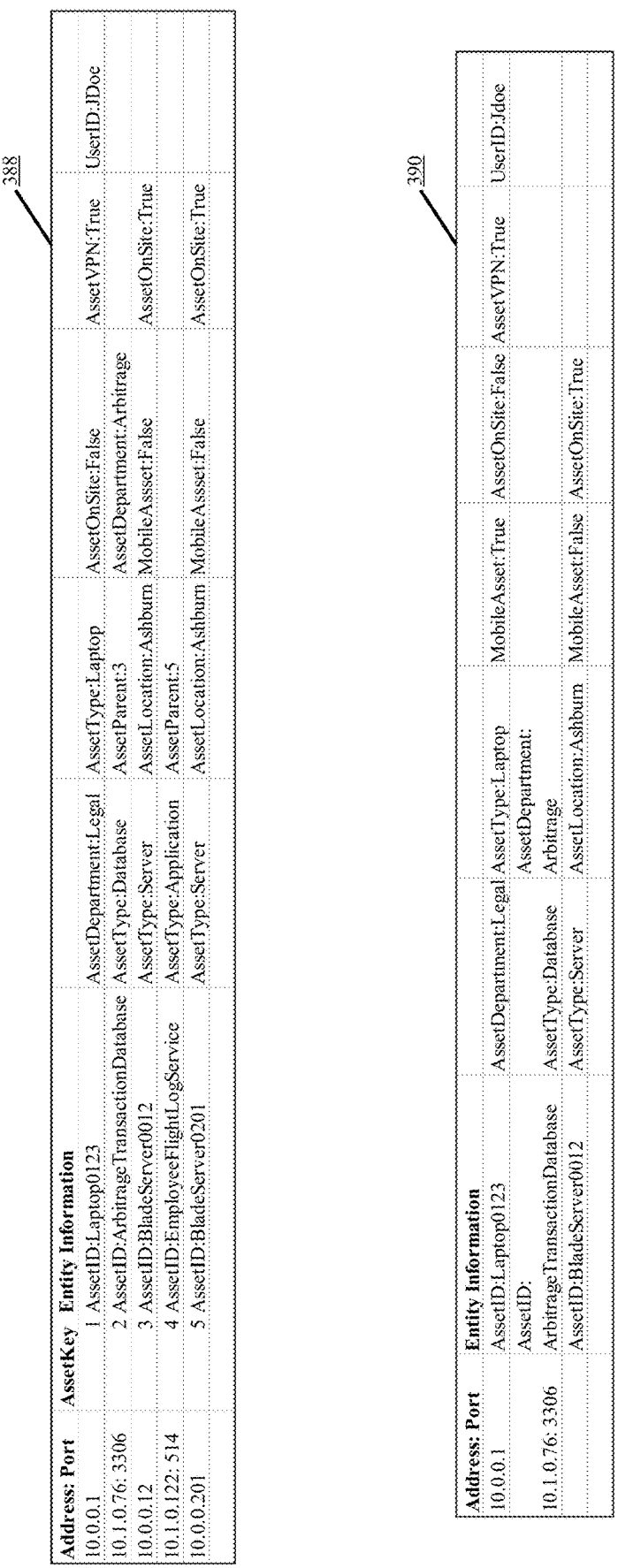

388

| Address: Port | AssetKey | Entity Information | | | | | |
|---|---|---|---|---|---|---|---|
| 10.0.0.1 | 1 | AssetID:Laptop0123 | AssetDepartment:Legal | AssetType:Laptop | AssetOnSite:False | | AssetVPN:True | UserID:JDoe |
| 10.1.0.76: 3306 | 2 | AssetID:ArbitrageTransactionDatabase | AssetType:Database | AssetParent:3 | AssetDepartment:Arbitrage | | | |
| 10.0.0.12 | 3 | AssetID:BladeServer0012 | AssetType:Server | AssetLocation:Ashburn | MobileAsset:False | AssetOnSite:True | | |
| 10.1.0.122: 514 | 4 | AssetID:EmployeeFlightLogService | AssetType:Application | AssetParent:5 | | | | |
| 10.0.0.201 | 5 | AssetID:BladeServer0201 | AssetType:Server | AssetLocation:Ashburn | MobileAsset:False | AssetOnSite:True | | |

390

| Address: Port | Entity Information | | | | | |
|---|---|---|---|---|---|---|
| 10.0.0.1 | AssetID:Laptop0123 | AssetDepartment:Legal | AssetType:Laptop | MobileAsset:True | AssetOnSite:False | AssetVPN:True | UserID:Jdoe |
| 10.1.0.76: 3306 | AssetID: ArbitrageTransactionDatabase | AssetType:Database | AssetDepartment: Arbitrage | | | |
| | AssetID:BladeServer0012 | AssetType:Server | AssetLocation:Ashburn | MobileAsset:False | AssetOnSite:True | |

| SourceEntity | TargetEntity | Permission | Priority |
|---|---|---|---|
| AssetVPN:False AND AssetOnSite:False | AssetID:ArbitrageTransactionDatabase | BLOCK | 1 |
| AssetDepartment:Legal | AssetID:ArbitrageTransactionDatabase | ALLOW | 2 |
| AssetDepartment:IT | AssetID:BladeServer0012 | ALLOW | 3 |
| AssetOnSite:False | AssetID:ArbitrageTransactionDatabase | BLOCK | 4 |

*394*

| SourceEntity | TargetEntity | Permission |
|---|---|---|
| AssetDepartment:Legal | AssetID:ArbitrageTransactionDatabase | ALLOW |

*FIG. 3C*

| Sender Address: Port | Source Entity Information | Target Entity Information | Receiver Address: Port | Permission |
|---|---|---|---|---|
| 10.0.0.1 | AssetDepartment:Legal | AssetID:ArbitrageTransactionDatabase | 10.1.0.76:3306 | ALLOW |

396

| Sender Address: Port | Receiver Address: Port | Permission |
|---|---|---|
| 10.0.0.1 | 10.1.0.76:3306 | ALLOW |

GRANULAR SECURITY SEGMENTATION FOR COMPUTING ASSETS

TECHNICAL FIELD

The present disclosure relates to dynamic real-time network connectivity management, and more particularly to control of network traffic based on dynamic changes in relationships with entities and other properties of computing assets.

BACKGROUND

Today, firewalls exist as software modules which act as an initial messaging filter when a computing asset, such as a computer device, attempts to send a data packet through a computing network. Generally, by examining the address of the intended recipient asset associated with the data packet, and the address of the sender, the firewall either blocks the message from passing through to the network, or allows the message to traverse the network to the intended recipient computing asset, such as another computer device. As the firewall typically acts as an initial filter, the firewall implements simple rules that can be checked with a minimum of processing power, in order to maximize the amount of traffic that can be checked. Consequently, the firewall generally does not check the contents of the data packet, which may be encrypted and opaque to the firewall. Further, the firewall does not consider or have access to more complex relationship definitions between a source asset and a target asset, in order to inform the decision to block or allow a particular data packet.

For example, conventional firewalls maintain a list of sets of source and target addresses and ports within a computer network which are permitted or disallowed to communicate with one another together with related priority rules. When a data packet arrives, the firewall seeks out the highest priority rule that includes both the source asset's address and the target asset's address, and then either allows or blocks the data packet based upon that rule.

However, at institutions with a large number of computing assets, such as computer devices, databases, and web servers, where access control of the computing assets can be determined by various, frequently changing properties of these computing assets, the conventional approach is inadequate. Therefore, it would be helpful to supplement the functionality of firewalls in order to improve management of network connectivity and allow granular security segmentation.

SUMMARY

The appended claims may serve as a summary of the invention.

BRIEF DESCRIPTION OF THE DRAWINGS

Example embodiments will now be described by way of non-limiting example with reference to the accompanying drawings, in which:

FIG. 3B illustrates an example tabular set of records in the asset hierarchy system, and an example tabular set of records returned from the enrichment engine.

FIG. 3C illustrates an example tabular set of records in the hierarchy permission system, and an example tabular set of records returned from the permissioning engine.

FIG. 3D illustrates an example tabular set of records created by the connectivity engine based on the records from the enrichment engine and the permissioning engine, and an example packet filter rule to be sent to the firewall in the gateway device.

DETAILED DESCRIPTION OF CERTAIN EMBODIMENTS

Figure 1:
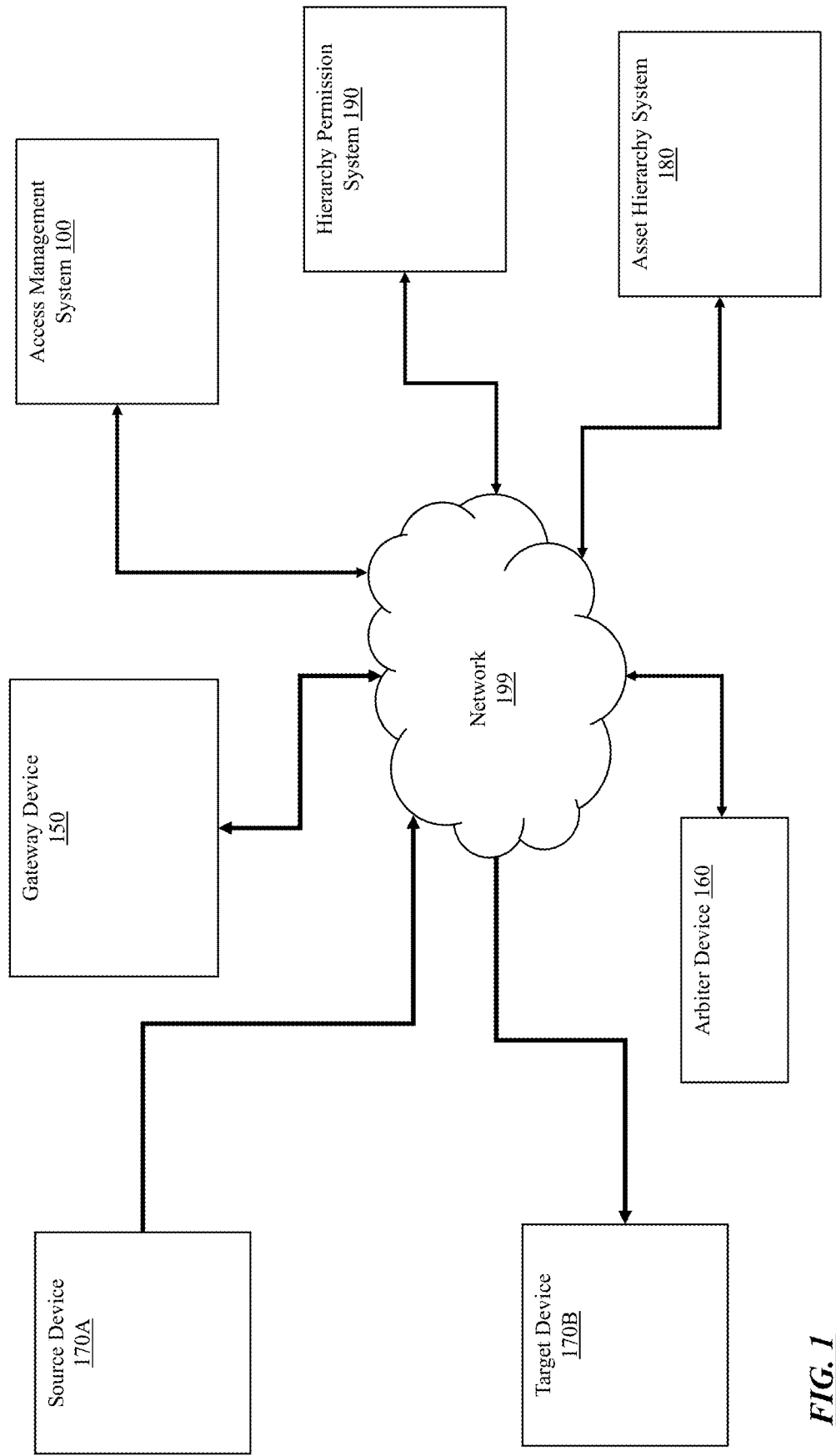
FIG. 1 illustrates an example networked system including an exemplar access management system in which various embodiments may be practiced.

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

1. General Overview

A method for dynamically managing network traffic of dynamically managing network traffic with granular security zones. The method includes receiving a first data packet from a user device, the first data packet including first identifying information indicating a sender computing asset and a receiver computing asset, each of the sender computing asset and the receiver computing asset including a computer resource in a computer network. The method further includes comparing the first identifying information to a first packet filter rule of a plurality of packet filter rules to produce a first comparison outcome. The method also includes, based on the first comparison outcome, blocking the first data packet from reaching the receiver computing asset. The method still further includes mapping, in response to the blocking, the first identifying information to entity information including a first path in a hierarchy of entities and a second path in a hierarchy of computing assets for the sender computing asset and a third path in the hierarchy of entities and a fourth path in the hierarchy of computing assets for the receiver computing asset, where each entry in the hierarchy of entities corresponds to a group of account identifiers. The method yet further includes matching the entity information with an entity permission of one or more entity permissions, each entity permission indicating that a specific source computing asset in the hierarchy of computing assets associated with a specific source computing asset in the hierarchy of entities can or cannot communicate with a specific target computing asset in the hierarchy of computing assets associated with a specific target entity in the hierarchy of entities. The method still further includes updating based on the matching, one or more packet filter rules of the plurality of packet filter rules. The method is performed by one or more processors.

In some embodiments, a system is configured to maintain network firewall rules (i.e., the plurality of packet filter rules) in compliance with evolving organizational relationships affecting relationships and access to physical computing hardware and digital assets.

In some embodiments, an arbiter device is configured to update a table of networking permissions associated with certain pairs of assets or entities in an organization. Each asset corresponds to a computer resource, while each entity corresponds to a user group. The organization may be a business or a government institution, or any group implementing a network. As an example, a user account assigned to an arbiter device may create a table record permitting computers owned by a legal team to access computers owned by an accounting team.

A source asset attempts to send a data packet to a target asset on a shared network. The data packet may include information, or a request for information. In this example, the source asset is a computer owned by the legal team. At first, a firewall is configured to deny data packets sent from the source asset to the target asset, access to the network. In this example, the target asset is a computer owned by the accounting team. The firewall is configured by a list of source internet protocol (IP) addresses paired to target IP addresses, and a rule either allowing or denying data packets to be sent from the source asset to the target asset over the shared network. In this example, there is no rule at the firewall regarding the IP address of the computer owned by the legal team sending packets to the IP address of the computer owned by the accounting team—and this particular firewall is configured to deny traffic when an explicit allowing rule cannot be found. After the firewall denies the data packet from the source asset intended for the target asset, the firewall logs in a log service the denial decision, along with the source IP address of the source asset, and the target IP address of the target asset.

A log parsing service reads the log created by the log service after each update and parses the log and pulls relevant information: in this example, the source IP address and the target IP address. The relevant information is then joined with relationship data in an enrichment engine in order to determine organizational relationships of the assets at the source IP address and the target IP address.

The enrichment engine has access to an asset hierarchy system. The asset hierarchy system maintains records of which assets are related to which organizational entities including teams or employees. Continuing the example, the source IP address relates to a computing asset assigned to John Doe, and John Doe is assigned to the legal team. The legal team may also be a sub-group of another group, such as a geographic group, e.g., North American Operations. The target IP address relates to a computing asset owned by the accounting team, which operates within North American Operations. The enrichment engine then creates a enriched record mapping the source computing asset with one or more assets in the hierarchy of computing assets, thereby traversing a hierarchy of computing assets that includes the source computing asset; as well as John Doe, the legal team, and North American Operations, thereby traversing a hierarchy of entities that includes entities directly and indirectly related to the source computing asset. The enriched record also includes an association between the target IP address with the target computing asset, thereby again traversing a hierarchy of computing assets that includes the target computing asset, as well as the accounting team and North American Operations, thereby traversing a hierarchy of entities that includes entities directly and indirectly related to the target computing asset.

The enriched record is then sent to a connectivity engine. The connectivity engine is configured to analyze the enriched record and determine whether the firewall should have blocked the data packet based on the current entity permissions provided by arbiter devices and stored in a hierarchy permission system. The connectivity engine does so by querying a permissioning engine as to whether the source asset (the source hierarchy of computing assets), John Doe, the legal team, and/or North American Operations (the source hierarchy of entities) should be allowed to send data packets to the target asset (the target hierarchy of computing assets), every asset on the accounting team, and/or every asset within North American Operations (the target hierarchy of entities).

The permissioning engine accesses a store maintained at the hierarchy permission system of the permissioning decisions made by users of arbiter devices. In this example, the permissioning engine retrieves from the hierarchy permission system the earlier decision to permit computers owned by the legal team to access computers owned by the accounting team. The permissioning engine and arbiter devices are configured to be able to receive source: target: rule tuples in a format where the source and target are identified by entity names or identifiers, such as user group names, rather than network identifiers such as IP addresses. In response to receiving a query that involves the legal team sending packets to the accounting team (i.e.: source computing asset to target computing asset), the permissioning engine retrieves the permission related to the legal team sending packets to the accounting team. In this example, the permission is to allow such packets to be sent. The permission indicating the allowance of the packet sending is then returned to the connectivity engine.

Now that the connectivity engine possess the rule that any legal team asset can send packets to any accounting asset, and the record that the source IP address is a legal team asset and the target IP address is an accounting asset, the connectivity engine combines the rule and the record in order to craft a firewall rule which would allow the source IP address to send packets to the target IP address.

Once the firewall rule is crafted, the connectivity engine uses the firewall application programming interface (API) to update the rules within the firewall such that a data packet from the source IP address to the target IP address is allowed and appropriately forwarded. The firewall itself does not need any information regarding the organizational entities related to the asset at the source IP address, or the organizational entities related to the asset at the target IP address; nor does the firewall need any information related to the organizational relationship between the legal team and the accounting team: the firewall only requires the source IP address which is to be granted permission to send data packets to the target IP address.

Finally, the source asset attempts to send a new data packet, or re-send a copy of the first data packet to the target asset. When this data packet reaches the firewall, the firewall decides, based solely on the source asset IP address, the target asset IP address, and the new rule provided by the connectivity engine and stored in the firewall list, that data packets from the source IP address are allowed to be sent to the target IP address. Consequently, the firewall allows the data packet to continue on to the target IP address.

The system and method disclosed herein has several technical benefits. The disclosed system maintains complex, dynamic, and granular access control information for computing assets, thus increasing the level of segmentation in network connectivity. The disclosed system also implements just-in-time access by allowing the firewall to remain as restrictive as possible and only open up access in response to demands, thus including the level of security for computing assets. Specifically, the disclosed system translates the organizational groups into groups of IP addresses fit for consumption and usage by a traditional firewall. The disclosed system also maintains appropriate IP address pairs as physical assets are added and removed from organizational groups. The disclosed system can also standardize and simplify rules within the firewall, reducing or eliminating multiple rules with the same source: target address pairs with unintentionally conflicting permissions. In organizations of hundreds of thousands of computing assets, billions of source: target relationships are possible, and every new asset introduces the possibility of hundreds of thousands more rules. Abstracting the firewall IP address relationships to their associated organizational relationships reduces the total number of firewall rules, improves management of the firewall rules, and automates firewall rule changes at the IP address and asset level.

2. Example Computing Environments

FIG. 1 illustrates an example access management system 100 in which various embodiments may be practiced, and is shown in a simplified, schematic format for the purposes of illustrating a clear example. Other embodiments may include more, fewer, or different elements.

Figure 6:
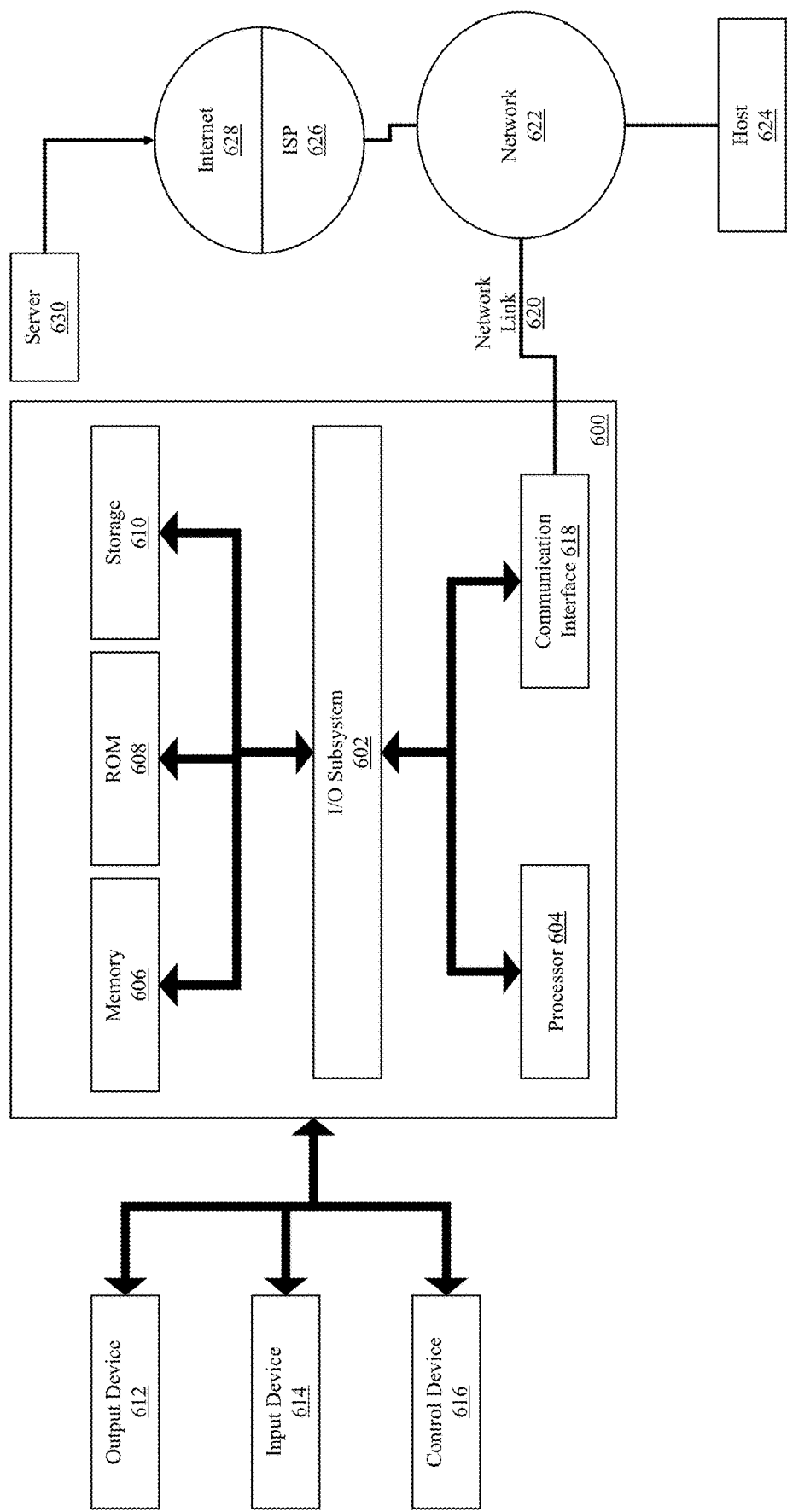
FIG. 6 illustrates a computer system upon which various embodiments may be implemented.

In some embodiments, a networked computer system comprises an access management system 100, a gateway device 150, an arbiter device 160, an asset hierarchy system 180, a hierarchy permission system 190, a source device 170A, and a target device 170B, which are communicatively coupled through direct physical connections, via a network 199, or as modules within a memory 606 of a computing system 600 with shared access to physical resources (see FIG. 6). The access management system 100 is communicatively coupled to the gateway device 150, which hosts a firewall 250 preferably partially or completely via a firewall API (see FIG. 2). In certain embodiments, the access management system 100 incorporates one or more of the other devices systems depicted herein in the networked computer system.

In some embodiments, the source device 170A is a managed computing asset with the ability to send messages over the network 199. Examples of communications network 199 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet. In some embodiments, the target device 170B is a managed computing asset with the ability to receive messages over the network 199. Each of the source device 170A and target device 170B can include additional computing assets, such as database servers or web clients running on the device or belong to other computing assets.

In some embodiments, the gateway device 150 is a networked computing device which manages data packet traffic over the network 199. The gateway device 150 can implement a firewall 250, which may allow or block messages sent between computing assets, including data packets sent from source device 170A to target device 170B via the network 199.

In some embodiments, the gateway device 150 is informed by the access management system 100 regarding which rules to implement, and which traffic to allow and block across the network 199. In particular, access management system 100 may provide pairs of sender addresses and receiver addresses, along with rules regarding whether to allow or reject data packets sent from the sender addresses to the receiver addresses.

In some embodiments, the access management system 100 is informed by an asset hierarchy system 180. The asset hierarchy system 180 maintains a pairing between computing assets (or "assets), and the organizational entities (or "entities") which relate to those assets. Each asset corresponds to a group of one or more computer resources, such as a computer application, a computer device, a computer network, or a server farm. Each entity corresponds to a user group of one or more users. Further, the asset hierarchy system 180 maintains hierarchical relationships between organizational entities. The asset hierarchy system 180 can also maintain hierarchical relationships between computing assets. Thus, when the asset hierarchy system 180 is sent a network 199 address or identifier of an asset, such as the IP address of source device 170A, the asset hierarchy system 180 is able to return at least information concerning the organizational entities that directly relate to the asset, such as the owner, controller, or accessor of the asset, as well as the entities that relate to that entity, such as the business department, office, geographic area, or language group to which that owner, controller, or accessor is a member of. Similarly, the asset hierarchy system 180 can return information related to the computing assets that relate to the asset. For example, for a database system installed on the source device 170A, the related entities can include the source device 170A or a group of shared services of which the database system is a member. Each entity or computing asset can have one or more properties, such as location or update status, that can also be used to decide whether communication between two computing assets is allowed.

In some embodiments, the access management system 100 is further informed by a hierarchy permission system 190. The hierarchy permission system 190 maintains a pairing between computer assets associated with respective entities, and a network permission (e.g., a first device with an owner, a second database with a controller in a business department, and an instruction to block data packets between the two). In some embodiments, the maintained pairing may also include a priority, ranking, or ordering, such that two or more pairings may be compared, ultimately implementing the highest priority pairing permission.

In some embodiments, the access management system 100 is configured to receive the identifying information 221C regarding a source computing asset associated with the source device 170A and a target computing asset associated with the target device 170B from the gateway device 150. The access management system 100 is configured to then send the identifying information 221C to the asset hierarchy system 180, and receive back information concerning at least the entities and potentially also the computing entities related to respective identifying information 221C. The access management system 100 is configured to then pair the identifying information 221C to the entity information 231A or asset information, thereby creating a query record. Next, the access management system 100 is programmed to send the query record to the hierarchy permission system 190, and receive back a decision of whether the source computing asset associated with the source device 170A is permitted or disallowed to send data packets to the target computing asset associated with the target device 170B.

In some embodiments, the access management system 100 is programmed to use one or more results from the hierarchy permission system 190 to instruct the gateway device 150 to allow or prevent future data packets sent from the source computing asset to the target computing asset.

In some embodiments, the hierarchy permission system 190 is not able to return a valid permission regarding whether the source computing asset is permitted or disallowed to send data packets to the target computing asset. In such cases, either the hierarchy permission system 190 or the access management system 100 sends the query record or a part thereof to an arbiter device 160 for further analysis.

In some embodiments, the arbiter device 160 the query record or a part thereof that does not necessarily include identifying information 221C. The arbiter device 160 is configured to determine whether any new rule involving the source computing asset and the target computing asset should be created, and if so create and send the rule to the hierarchy permission system 190 or indirectly to the hierarchy permission system 190 via the access management system 100.

3. Functional Descriptions

Figure 2:
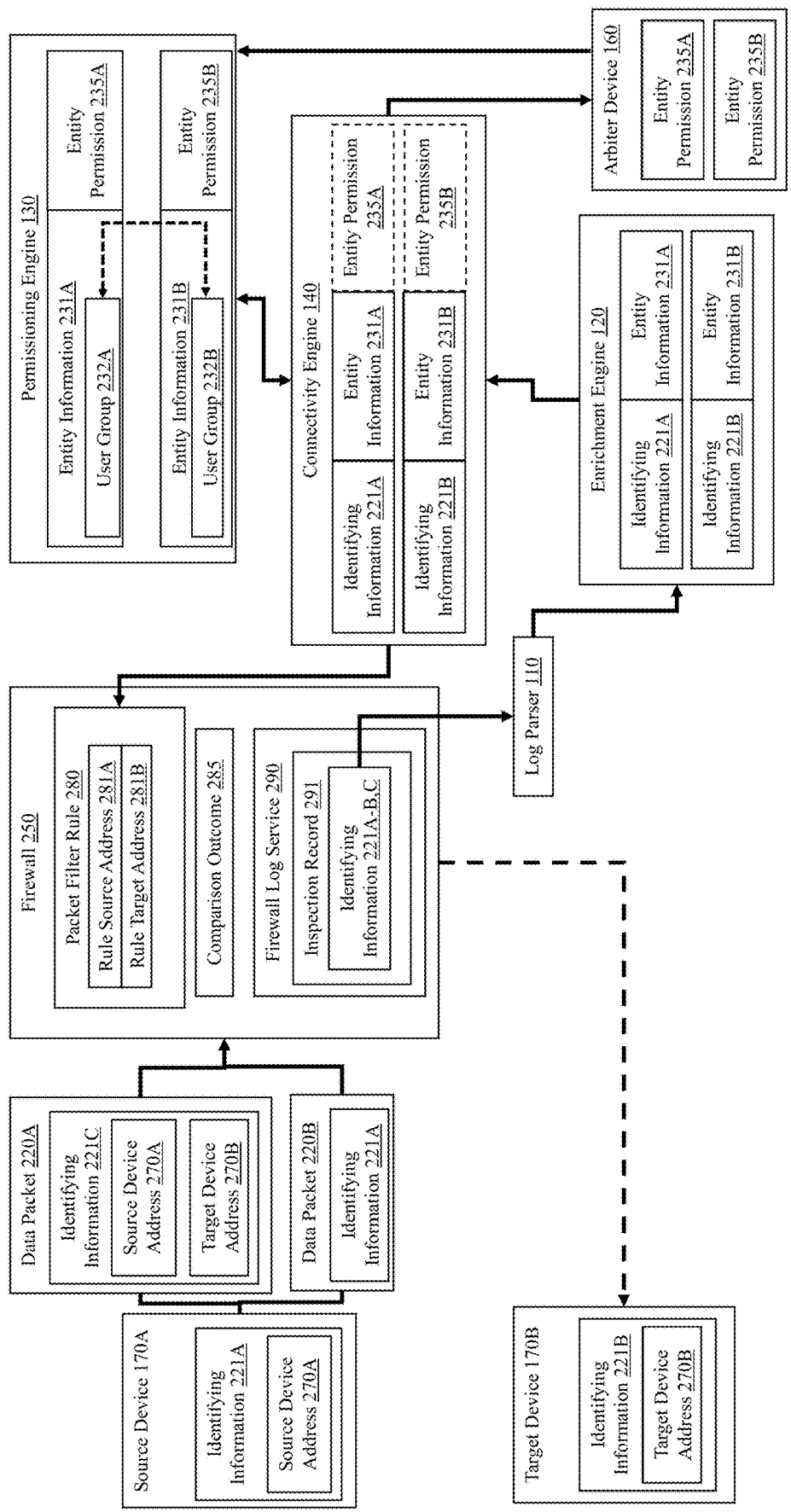
FIG. 2 illustrates a relational diagram depicting several assets, a firewall, and several engines implementing portions of an exemplar access management system.

FIG. 2 illustrates a relational diagram depicting several devices 160, 170A-B, a firewall 250, and several engines 120, 130, 140 implementing portions of an exemplar access management system 100, and is shown in a simplified, schematic format for purposes of illustrating a clear example.

In some embodiments, the firewall 250, which is implemented within gateway device 150 is a network security system that controls network traffic passing through the firewall 250 based on rules. A system and method for establishing those rules for communication with a host is described in U.S. Pat. No. 7,991,899, titled "Systems and methods for establishing rules for communication with a host", which is incorporated by reference in its entirety. In particular, the firewall 250 allows or blocks data packets depending upon the identifying information 221A of the sender and the identifying information 221B of the receiver: if a rule within the firewall 250 allows data packets to move from the sender to the receiver, the firewall 250 allows data packets from the sender to proceed or be forwarded to the receiver; if a rule within the firewall 250 prohibits data packets from moving from the sender to the receiver, or if no rule within the firewall 250 covers the relationship between the sender and the receiver, the firewall 250 rejects or blocks data packets from the sender, preventing those data packets from reaching the receiver. Whether the data packet is permitted or denied, the firewall 250 writes a record of the event, including the identifying information 221A of the sender, the identifying information of the receiver 221B, and the firewall 250 decision, to a data log. The identifying information 221A-C generally includes a device address identifying a computer device address. It can also include a port identifying a computer application. The device address alone or together with the port identifies a computing asset.

In some embodiments, the log parser 110 is a software application configured to review the data log maintained by the firewall 250, to retrieve permitting or denial decisions based on the firewall rules, and associated sender and receiver identifying information 221A-B. The log parser 110 formats the retrieved data, stripping any data deemed extraneous (e.g., records not related to permitting or denials, record elements related to data packet size, etc.). The log parser 110 then forwards the formatted data to an enrichment engine 120. The log parser 110 may be embedded within or a subroutine of the gateway device 150, access management system 100, firewall 250, enrichment engine 120, or connectivity engine 140; or the log parser 110 may be included in a computing device not shown here but connected to the network 199.

In some embodiments, the enrichment engine 120 is a software application configured to review formatted records from the log parser 110, and enrich those records with organizational data. Organizational data includes the hierarchical information related to employees, teams, geographies, and other real-world entities at the organization serviced by the firewall 250, hierarchical information related to computing assets of the organization, such as network devices, personal devices, databases, web services, or other applications, and the relationships between the entities and the computing assets. The organizational data can be maintained by separate processes, which update relationships between entities and computing assets as the hierarchical information or relationships change. Relationships can include ownership, management hierarchies, leasings, access, or other connections and connection types between entities and assets.

As an example, a laptop is purchased by the organization. Once on the premises of the organization, the laptop is under the ownership of the information technology (IT) department, and may further be identified as an "unprovisioned asset." The laptop has a media access control (MAC) identifying information by which it can be identified, and further when connected to the network 199 has an IP identifying information by which it can be identified. The organizational data will reflect that the laptop, as identified by its IP identifying information, is part of the IT department, and the sub-group of unprovisioned assets. However, if the legal department hires a new employee, that employee may be physically given the laptop for their professional use. Concurrent with the transfer of the laptop to the legal department, and then to the specific new hire, the organizational data is updated to reflect that the laptop, as identified by its IP identifying information, is part of the legal department and no longer part of the unprovisioned assets. Assets may be associated with multiple entity groups or asset groups. The enrichment engine 120, having received the formatted records from the log parser 110, searches the organizational data within the asset hierarchy system 180 for entities associated with the source identifying information 221A, as well as organizational data for entities associated with the target identifying information 221B. Organizational data can also include assets to which the asset associated with the source identifying information 221A or target identifying information 221B are related to. For example, the asset associated with the source identifying information 221A may be a database of historical data. That asset database resides on a physical hard drive, or multiple physical hard drives in a drive array, which resides on a computing device: the hard drive(s), any drive array including one or more of the hard drive(s), the computing device, and resources of the computing device such as processors and network interfaces, may each individually or collectively, in part or in whole, be assets themselves: an asset can be defined at any level of conceptualization, and may be defined to include hardware, software, or a combination thereof. Each or all of those assets may have unique relationships with any number of entities. The enrichment engine 120 is able to forward a sender: receiver enriched data pair to the connectivity engine 140, where the enriched sender data includes the sender identifying information 221A, and each entity or asset group, and sub-group associated with the sender identifying information 221A in the organizational data, forming a first sender path in the entity hierarchy, which can be enhanced with a second sender path in the asset hierarchy; the enriched receiver data includes the receiver identifying information 221B, and each entity or asset group, and sub-group associated with the receiver identifying information 221B in the organizational data, forming a first receiver path in the entity hierarchy, which can be enhanced with a second receiver path in the asset hierarchy.

In some embodiments, the enrichment engine 120 maps the identifying information 221A-B to entity information 231A-B, respectively. The entity information 231A-B, which includes user groups 232A-B, correlates to the entity data disclosed above. The identifying information 221A-B, which can include the IP address, network port, or other identifying information 221C from the data packet 220A and stored in inspection record 291, maps to at least one organizational entity-those entities may also map to other entities in a hierarchy, and therefore those entire hierarchies are mapped to as well. Structurally, the identifying information 221A-B may map to one or more hierarchies (including multiple paths to a root), which are maintained in their hierarchical structure (e.g., employee ID to team ID to department ID to geography ID; as for example a tree or linked list), and that hierarchical structure may be used by the permissioning engine 130 or the connectivity engine 140. Alternatively, in some embodiments, the entities in an associated hierarchy are returned in no particular order (e.g., an unordered array)—in such embodiments, priority among entities is managed not by the hierarchy of those entities as stored within the asset hierarchy system 180, but rather by the priority information as stored within the hierarchy permission system 190. The discussion above also applies to mapping the identifying information 221A-B to asset information.

In some embodiments, the enrichment engine 120 sends or returns the identifying information 221A-B and the entity information 231A-B associated with the identifying information 221A-B to the connectivity engine 140. In some embodiments, the identifying information 221A-B may not be sent in whole or in part to the connectivity engine 140 from the enrichment engine 120 if the connectivity engine 140 obtains that information through another path, for example directly from the log parser 110.

In some embodiments, the connectivity engine 140 is a software application configured to receive enriched data pairs from the enrichment engine 120, the enriched data pairs including, for example, some or all of identifying information 221A paired with all of the entity information 231A associated with the asset found by the identifying information 221A (e.g., source asset). The connectivity engine 140 also requests related permission data from a permissioning engine 130, and then compares related permission data with the enriched data pairs to determine whether a source asset could communicate with a target asset, potentially producing new or revised rules for the gateway device 150. Initially, the connectivity engine 140 receives the sender: receiver enriched data pair from the enrichment engine 120 in the form of identifying information 221A associated with entity information 231A paired with identifying information 221B associated with entity information 231B. The connectivity engine 140 then sends the organizational data components (entity information 231A together with available sender asset information paired with entity information 231B together with available receiver asset information) to the permissioning engine 130. The permissioning engine 130 does not require the sender identifying information 221A or the receiver identifying information 221B, or any other data included within identifying information 221A-B, in determining permissions; rather, the permissioning engine 130 utilizes information related to the entities and computing assets associated with the sender and the receiver, respectively.

In some embodiments, connectivity engine 140 will only process or send a request to the permissioning engine 130 after having received multiple requests related to the same sender identifying information 221A and receiver identifying information pair 221B. In some embodiments, enrichment engine 120 will only process or send data to the connectivity engine 140 after having received multiple requests relates to the same sender identifying information 221A and receiver identifying information 221B pair. An advantage of awaiting multiple data packets 220A with the same identifying information 221C can be reduced processing complexity, reduced analysis load on the arbiter device 160, aggregating multiple similar but not identical data packets and security advantages such as reducing the risk of falling victim to port scan attacks or a denial-of-service attacks.

In some embodiments, the permissioning engine 130 is a software application configured to receive pairs of sets of entities (and additional pairs of sets of computing assets) and determine whether a user account on an arbiter device 160 has created a rule between the source computing entity and the target computing entity, by querying the hierarchy permission system 190 with a pair of sets of entities (or together with a pair of sets of computing assets) and receiving back a permission (e.g., allow, deny) and optionally the matching rules. In some embodiments, the permissioning engine 130 may receive back a priority ranking for each matching rule, in order to select the highest priority permission.

In some embodiments, the permissioning engine 130 receives entity information 231A-B, and compares entity information 231A-B (and asset information) to records in the hierarchy permission system 190, returning entity permissions 235A-B (rules) which match to entity information 231A-B or rule matching results. The comparison with a rule involves determining whether the source entity and source computing asset in the rule are respectively in the sets of entities and computing assets associate with the sender computing asset and whether the target entity and target computing asset in the rule are respective in the sets of entities and computing assets associated with the receiver computing asset. This comparison can also be performed by the connectivity engine 140.

As an example, a first rule may indicate that an asset that is associated with (and thus considered to be in) the unassigned entity group may not receive packets from any asset associated with the North American Operations entity group. A second rule may however indicate that an asset associate with the unassigned entity group may receive packets from an asset associated with the IT entity group, and that the second rule overrides the first rule when relevant. In such an example, if the permissioning engine 130 is provided a pair including a sender in the IT group, which is in the North American Operations group, and a receiver in the unassigned group, which is in the IT group, which is in the North American Operations group, the permissioning engine 130 would return both the first rule and the second rule to the connectivity engine 140. The permissioning engine 130 may also return any instruction or indication that the second rule overrides the first rule. Alternatively, the permissioning engine 130 may consolidate the rules, sending the combined conclusion that the second rule ultimately applies, and that the IT group may send data packets to the member of the unassigned group.

In some embodiments, permissions may be asymmetric: asset A may be able to send packets to asset B, but asset B may not be able to send packets to asset A. In practice, due to the structures of network protocols (e.g., TCP SYN, SYN-ACK, ACK steps to open communication) requiring back and forth data packets to facilitate access, permissions may essentially be symmetric. Further, in such cases the distinction between entity permission 235A and entity permission 235B may be immaterial: both permissions describe, for example, either allowing asset A to send packets to asset B, or vice versa. In such embodiments, hierarchy permission system 190 may only store one entity permission 235A for a pair of assets, permissioning engine 130 may only report one entity permission 235A for a pair of sender and receiver assets to connectivity engine 140, or connectivity engine 140 may only process one entity permission 235A for a pair of sender and receiver assets.

In some embodiments, the permissioning engine 130 tracks the number of data packets from a specific sender asset to a specific receiver packet that fail to match a rule and only returns permission allowing connectivity between from sender asset to the target asset after the number exceeds a specific threshold. The permissioning engine 130 could also track other statistics, such as the frequency of data packets associated with the same pair of sender asset and receiver asset that fail to match a rule or the number or frequency of data packets associated with similar pairs of sender assets and receiver assets based on specific similarity criteria that fail to match a rule.

In some embodiments, returning to the connectivity engine 140, upon receiving the one or more rules, possibly with priority information but without the matching results, from the permissioning engine 130, the connectivity engine 140 can map the enhanced data pairs from the enrichment engine 120 to the rules from the permissioning engine 130, to determine whether a source computing asset could communicate with a target computing asset. The determination can include creating an unbroken associative link between the identifying information 221A, the entity information 231A (as provided by the enrichment engine 120), the entity permission 235A (as provided by the permissioning engine 130), the entity permission 235B (as provided again by the permissioning engine 130), the entity information 231B (as provided again by the enrichment engine 120) and the identifying information 221B. The connectivity engine 140 could also determine whether to produce a firewall-ready rule. The firewall-ready rule maps identifying information 221C of a sender and a receiver, both provided from the enrichment engine 120, onto a permissioning decision from the permissioning engine 130. In other embodiments, the firewall-ready rule could allow all sender source assets and target assets covered by a matching rule. Such a mapping can be made by taking the unbroken associative link described above, and excising the entity information 231A-B and any linking keys, resulting in a record containing identifying information 221A, identifying information 221B, and the permission included in either or both of entity permission 235A-B. Once the firewall-ready rule is created, the rule is provided to the firewall 250 via the firewall API, which enforces a standardized format expected by the firewall 250 for rules. The firewall-ready rule could lead to a new or updated firewall rule, such as when it is the first time the source asset attempts to access the target asset. The firewall 250 can then forward or block traffic based upon the permissioning decision with respect to the sender identifying information 221A and the receiver identifying information 221B.

In some embodiments, when the connectivity engine 140 is unable to create a firewall-ready rule due to the permissioning engine 130 not having a rule for any of the pairs of sets of entities or sets of assets, the connectivity engine 140 forwards the pairs of sets of entities or sets of assets to an arbiter device 160 for further processing.

In some embodiments, an arbiter device 160 utilized with an arbiter account of a user or an administrator, is configured to review permissioning scenarios that have not been evaluated and entered into the permissioning engine 130. The arbiter device 160 can be configured to create new entity permissions 235A-B determining communication permissions between pairs of assets associated with pairs of entities. In an example, the desktop computer assigned to a European IT employee attempts to communicate with a laptop belonging to the unassigned entity group in the North American Operations group, for remote configuration of the laptop. If the desktop has never attempted to connect to an asset in the unassigned group in the North American Operations group, the permissioning engine 130 may not have a particular rule for this scenario. Therefore, the permissioning engine 130 would not return a permission related to this sender: receiver pair, and the connectivity engine 140 would forward the enriched pair to an arbiter device 160. Then, the arbiter device 160 can be configured to create a rule allowing data packets sent between the pair to be forwarded, create a rule blocking data packets sent between the pair, or take no action. The arbiter device 160 can also be configured to grant limited access. In an example, the IT employee's user account may be identified as a North American employee account, assigned to work North American hours, with the default permissions associated with membership in the North American IT group, while being associated with the European IT group for payroll and registration purposes. In such an example, the arbiter device 160 can be configured to create an individual exception by permitting the desktop access to the particular laptop, to assets in the unassigned group, or to any asset the IT group under the North American Operations group has access to. The arbiter device 160 can also be configured to create a new group or sub-group, such as a group entitled "North American IT Remote in Europe", and then permit that assets in that group to perform the tasks associated with the IT group under the North American Operations group, while still granting access to employee-facing assets in the human resources group, as well as other generalized IT resource assets in the European Operations group.

In some embodiments, the arbiter device 160 can be configured to consolidate multiple permissioning scenarios set for review, in order to produce a unified rule, by analyzing entity hierarchies of entities and of assets associated with the assets which require arbitration. For example, if a novel asset (e.g., a network-ready orbital satellite) is introduced to the network 199, multiple other assets may rapidly attempt to access the novel asset. Those attempts may be individually logged into the arbiter device 160, as the novel asset has no records in the hierarchy permission system 190. However, the arbiter device 160 may determine, via analysis of the entity hierarchies of the sender entities, that almost all of the requests are generated by devices assigned to financial analysts assigned to a particular U.S. aerospace investment fund, and almost every personal computing device assigned to a financial analysts assigned to the particular U.S. aerospace investment fund has attempted to send a data packet to the receiver. The arbiter device 160 may propose a rule allowing personal computing devices or all computing assets of financial analysts assigned to the particular U.S. aerospace investment fund access to the novel asset. Utilizing machine learning and artificial intelligence would allow for capturing more complex data packet sending patterns.

In some embodiments, all entity permissions 235A made at the arbiter device 160 are associated with an user account or analytics process that created the entity permission 235A. By maintaining this association, the auditing of which user account or which process allowed or blocked particular network traffic is facilitated. In conventional systems, tracking the creator or editor accounts of particular firewall rules is not always robust, and certain firewall rules may not be readily traced to a particular administrative account.

Figure 3A:
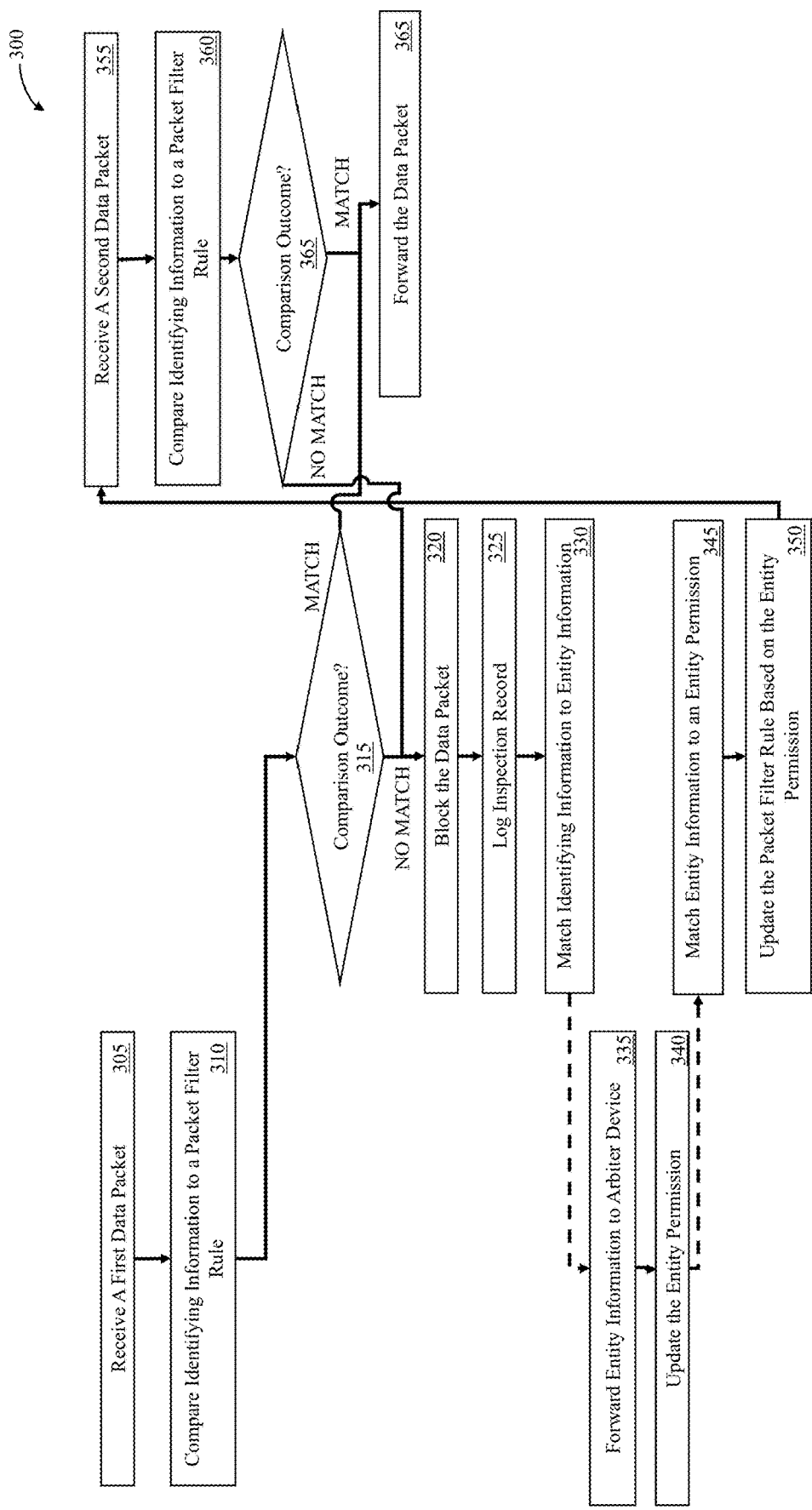
FIG. 3A illustrates a flowchart depicting an exemplar protocol for processing data packets and updating a firewall.

FIG. 3A illustrates a flowchart depicting an exemplar protocol 300 for processing data packets and updating a firewall 250. FIG. 3B illustrates an example tabular set of records in table 388 in the asset hierarchy system 180, and an example tabular set of records in table 390 returned from the enrichment engine 120. FIG. 3C illustrates an example tabular set of records in table 392 in the hierarchy permission system 190, and an example tabular set of records in table 394 returned from the permissioning engine 130. FIG. 3D illustrates an example tabular set of records in table 396 created by the connectivity engine 140 based on the records from the enrichment engine 120 and the permissioning engine 130, and an example packet filter rule 280 instruction in table 398 to be sent to the firewall 250 in the gateway device 150. In block 305, a first data packet (e.g., data packet 220A) reaches firewall 250. The firewall 250 then compares the identifying information (e.g., identifying information 221C) with the packet filter rule 280, in block 310 particularly comparing rule source address 281A to identifying information 221A, and rule target address 281B to identifying information 221B, producing comparison outcome 285.

Next, in block 315, comparison outcome 285 is analyzed. If comparison outcome 285 resulted in no firewall rule being located, or if it resulted in locating packet filter rule 280, which includes an instruction to block or reject data packet 220A, the protocol 300 moves to block 320. If comparison outcome 285 resulted in locating packet filter rule 280, which includes an instruction to allow data packet 220A, the protocol moves to block 365. In block 320, the firewall 250 blocks forwarding of data packet 220A to target asset. Next, in block 325, the firewall 250 logs the identifying information 221A along with the comparison outcome 285 conclusion in an inspection record 291. The inspection record 291 is produced irrespective of whether the data packet 220A is blocked or forwarded.

In block 330, the identifying information 221C is retrieved, and the identifying information 221A-B of the sender and receiver are paired with respective entity information 231A-B retrieved from the asset hierarchy system 180. The records within the asset hierarchy system 180 in an example could be structured in the human-readable tabular format shown in table 388. Table 388 includes a column associating an IP address with a port number with an asset ID, and a column depicting non-tabular data including associations of a particular asset. For example, in the first row, an asset with an assetKey of "1" is presently at the IP address "10.0.0.1" on network 199. The asset is associated with an "assetID" of "Laptop0123", which can be a human-readable identifier for the asset. The business department as an entity associated with the asset is the "legal" department. The asset is identified a being of the laptop type; the asset is currently identified as being not on-site, or on the physical premises of the organization; and the asset is identified as being connected to network 199 via a VPN. The asset is associated with a "userID" of "JDoe" as an entity, which could indicate the asset is currently owned or used by a user account with a username of "JDoe". The AssetType is tracked within the asset hierarchy system 180, and maintained by processes that associated metadata with particular assets and entities In a second row, an asset is identified as an "ArbitrageTransactionDatabase", which is of the database type, uniquely connected to the network 199 at the IP address 10.1.0.76. with port 3306. The asset is identified as an asset associated with the arbitrage department as an entity. Because the second asset identifies this third asset as a parent asset, in this example the "ArbitrageTransactionDatabase" is associated with the arbitrage department as an entity. The second asset has a parent identified as the third assetKey in table 388.

In a third row, an asset is identified as "BladeServer0012", which is of the server type, uniquely connected to the network 199 at the IP address 10.0.0.12, and physically located in Ashburn, Virginia. Because the second asset identifies the third asset as a parent asset, in this example the "ArbitrageTransactionDatabase" is a database residing on "BladeServer0012".

In a fourth row, an asset is identified as "EmployeeFlightLogService", which is of the application type, and uniquely connected to the network 199 at the IP address 10.1.0.122 with port 514. This application (which may be a program or process for tracking employee flight travel history) has a parent identified as the sixth assetKey in table 388.

In a fifth row, an asset is identified as "BladeServer0201", which is of the server type, uniquely connected to the network 199 at the IP address 10.0.0.201. Because the fourth asset identifies the fifth asset as a parent asset, in this example "EmployeeFlightLogService" is an application residing on "BladeServer0201".

The enrichment engine 120 first queries the asset hierarchy system 180 for the related records to the sender address and any sender port, which in this example is "10.0.0.1". The asset hierarchy system 180 returns all of the entity records related to the asset at "10.0.0.1", as well as any parent or child assets. Here, AssetKey "1" has no parents or children, so only the first row from table 388 is returned as a record in table 390.

Next, the enrichment engine 120 queries the asset hierarchy system 180 for the related records to the receiver address and any receiver port, which in this example is "10.1.0.76:3306". The asset hierarchy system 180 returns all of the entity records related to the asset at "10.1.0.76:3306", as well as any parent or child assets. Here, based on the relationships the records related to assetKeys "2" and "3" are returned as associated with IP address "10.1.0.76:3306".

In other embodiments, additional ancestor assets of lower-level assets in the hierarchy of assets that include the receiver asset could be retrieved or be considered as related entity records.

The enrichment engine 120, when resolving parent and child asset relationships, may concatenate entity information 231A and any asset information from parent and child assets into a single list associated with a single sender or receiver IP address when creating table 390. Alternatively, the entity information 231A may be preserved in a hierarchical structure.

As shown here, table 388 may be described as a first column of IP addresses and port information, a second column of an integer key, and a third column of unstructured data, such as a JavaScript Object Notation (JSON) Binary Large Object (BLOb), which contains a variable list of key: value pairs within the unstructured data. In an alternative embodiment, each entity key: value pair may be represented as a row: column pair in table 388. Table 388 may be a Sparse Table, or it may be a conventional one or more data tables or views.

Ultimately, the resulting table 390 indicates that, for example, not only is the asset at 10.1.0.76:3306 a database identified as "ArbitrageTransactionDatabase", but that it resides on a server identified as "BladeServer0012", and is physically located in Ashburn, Virginia; it is not located on a physically mobile computing device, and that the physical computing device upon which is resides is located on-site at the organization.

In this example, it should be noted that the fourth and fifth assets of table 388 are not returned in table 390—these assets are not associated with the sender or receiver IP addresses, and further are not a parent or child asset of an asset associated with the sender or receiver IP address.

In this example, the IP addresses in table 388 are non-sequential. In some conventional access management schemas, series of IP addresses are sequentially assigned to assets which are grouped by organizational entities, e.g., all laptops assigned to the legal department will have an IP address in the 10.0.0.1-100 range. However, in complex dynamic networks 199, preplanning assignment of IP addresses based on organizational entities can be extremely difficult, as well as wasteful of address space when certain organizational entities utilize less IP addresses than were assigned to their entity. The access management system 100 facilitates efficient management of non-sequential IP addresses, without requiring individual management of IP address pairs across an organization with hundreds of thousands of computing assets.

Next, if there are matching entity permissions 235A-B for the pair of entity information 231A-B, the entity permissions 235A-B are matched to entity information 231A-B. The connectivity engine 140 selects all of the entity information 231A related to the sender (i.e., "AssetID: Laptop0123", "AssetDepartment: Legal", "AssetType: Laptop", "AssetOnSite: False", "AssetVPN: True", "UserID: JDoe") and combines this entity information 231A into the first half of a pair of sets of entity information 231A. Next, the connectivity engine 140 selects all of the entity information 231B related to the receiver (i.e., "AssetID: ArbitrageTransactionDatabase", "AssetType: Database", "AssetDepartment: Arbitrage"; "AssetID: BladeServer0012", "AssetType: Server", "AssetLocation: Ashburn", "MobileAsset: False", "AssetOnSite: True") and combines this entity information 231B into the second half of a pair of sets of entity information 231B. Then, the connectivity engine 140 sends the pair of sets of entity information 231A-B to the permissioning engine 130 to obtain permissions.

The permissioning engine 130 queries the hierarchy permission system 190, which has records as depicted in table 392. Table 392 includes a first column for entity information related to a source asset, a second column for entity information related to a target asset, a third column related to what the permission is (e.g., BLOCK or ALLOW), and optionally a fourth column indicating the priority of the rule, with higher priority rules overriding lower priority rules.

A query of the hierarchy permission system 190 returns a record when any entity information 231A in the first set of entity information 231A matches the entire requirement of the first column, and when any entity information 231B in the second set of entity information 231B matches the entire requirement of the second column. For example, the first row in table 392, which has the highest priority of "1", requires that the sender asset not be connected by VPN to network 199, and that the sender asset not be physically on-site at the organization. The first row also requires that the receiver be the "ArbitrageTransactionDatabase". If the requirements are met, elements of this row are returned to the connectivity engine 140 from the permissioning engine 130. Such a rule indicates that any device or asset attempting to connect to the Arbitrage Transaction Database must either by physically on-site, or it must be connected to network 199 via a VPN, or data packets will be blocked. The relevant record from 390 related to the sender indicates that the sender asset at "10.0.0.1" is connected to network 199 via a VPN; therefore, this first rule is not satisfied, and the next rule is analyzed.

In the second row of table 392, if the sender asset is associated with the legal department, and the receiver asset is the ArbitrageTransactionDatabase, then the permission is to allow the data packet 220B from the sender to the receiver. In this example, the sender asset is associated with the legal department, and the receiver asset is the ArbitrageTransactionDatabase, and so the rule is relevant. The permissioning engine 130 selects this rule, and excises rows and elements that are not utilized by the connectivity engine 140, creating table 394 to send to connectivity engine 140. Rules with priorities "3" or "4" are not examined, as they are lower priority than rule of priority "2", which has been found to be relevant. Rule of priority "3" indicates the IT department is permitted to access the blade server 0012 upon which the Arbitrage Transaction database resides. Rule of priority "4" indicates that, without regard for what other rules may follow (not shown rules of priorities "5+") if an asset is not physically on-site at the organization, the asset cannot access the Arbitrage Transaction Database. Taken collectively, rules of priority "1-4" require that all connections to the arbitrage transaction database either be from an on-site device or via a VPN. Only legal can access elements of the arbitrage transaction database from off-site (while using a VPN), and IT can only access the server itself, while off-site. Other lower priority rules may, for example, allow other on-site applications to populate records in the arbitrage transaction database, or may allow other user accounts to administrate the arbitrage transaction database, but only when doing so from a physical computing device that is on-site at the organization, as per rule of priority "4".

It should be understood that traits or properties of assets can be understood equally as memberships in entity groups. For example, when "AssetOnSite: False" is an entity, that may represent a trait of the asset as not being on site, as determined by some process or protocol, or it may equally represent the asset being a member of an entity group for which all non-on-site assets are members. "AssetID: Laptop0123" may represent an identifier trait of the asset with the value "Laptop0123", or it may indicate that the asset is a member of an entity group that has one member: Laptop0123. An asset could be a member of one or more higher-level assets in the hierarchy of assets or be associated with an entity which is a member of one or more higher-level entities in the hierarchy of entities. An asset could also be understood to be a member of one or more potentially overlapping entity groups that include assets in the hierarchy of assets.

If no match can be made, the entity information 231A-B pair is forwarded to an arbiter device 160 in block 335. The arbiter device 160 may create an entity permission 235A-B for the entity information pair 231A-B, or the arbiter device 160 may do nothing. If no matching entity permissions 235A-B are created, the comparison outcome 285 and action in block 320 will remain the same for a subsequent packet 220B.

If a match between the pair of entity information 231A-B and entity permissions 235A-B can be found, in block 350 the packet filter rule 280 can be created or updated based on the entity permissions 235A-B.

In this example, the connectivity engine 140 makes a match by comparing the record in table 394 and joining it with the data in table 390. For example, IP address "10.0.0.1", the sender address, which is associated with "assetDepartment: Legal", from table 390, can be joined to the record in table 394 by virtue of the matching value of "assetDepartment: Legal" in the entity information 231A of the second column of table 390 and the source entity information 231A of the first column in table 394. IP address and port number "10.1.0.76:3306", the receiver address and port number, which is associated with "ArbitrageTransactionDatabase", from table 390, can be joined to the same record in table 394 by virtue of the matching value of "ArbitrageTransactionDatabase" in the entity information 231B of the second column of table 390 and the target entity information 231B of the second column in table 394. The join between table 390 on the source entity information 231A, to table 394 of the permission information, joined again to table 390 on the target entity information 231B, produces a result table structured like table 396, indicating that sender IP address "10.0.0.1", by virtue of the sender asset being associated with the legal department, is allowed to message receiver IP address and port number "10.1.0.76:3306" by virtue of the target asset being associated with the database "ArbitrageTransactionDatabase". The connectivity engine 140 then pares down the result, removing columnar information and any then-redundant row information extraneous to the purposes of firewall 250, in order to produce a firewall-ready rule in table 398, which concisely contains the sender IP address of "10.0.0.1", the receiver IP address and port number of "10.1.0.76:3306", and the permission "ALLOW"ing data packets to flow from "10.0.0.1" to "10.1.0.76:3306".

Once the packet filter rule 280 is created or updated, firewall 250 behavior may change when presented a data packet 220B from source asset to target asset. In block 355, a second data packet 220B is received at the firewall 250, from source asset, intended for target asset. In block 360, the firewall 250 again compares the identifying information (e.g., identifying information 221C) with the packet filter rule 280, particularly comparing rule source address 281A to identifying information 221A, and rule target address 281B to identifying information 221B, producing a potentially revised comparison outcome 285.

Next, in block 365, comparison outcome 285 is analyzed. Comparison outcome 285 now may result in locating packet filter rule 280, but one which includes an instruction to block or reject data packet 220A. If so, the protocol 300 moves to block 320. However, if comparison outcome 285 includes an instruction to allow data packet 220A, the protocol moves to block 365.

In block 365, the firewall 250 forwards the data packet 220B to be transmitted through to target asset. By this protocol 300, a first data packet 220A, though rejected at the firewall 250, triggers a review process implemented by the access management system 100, which ultimately may re-provision the rules of the firewall 250 based on complex relationships between the source asset and target asset, rather than merely computer networking relationships, and allow future or re-sent data packets 220B to move from source asset to target asset.

Figure 4A:
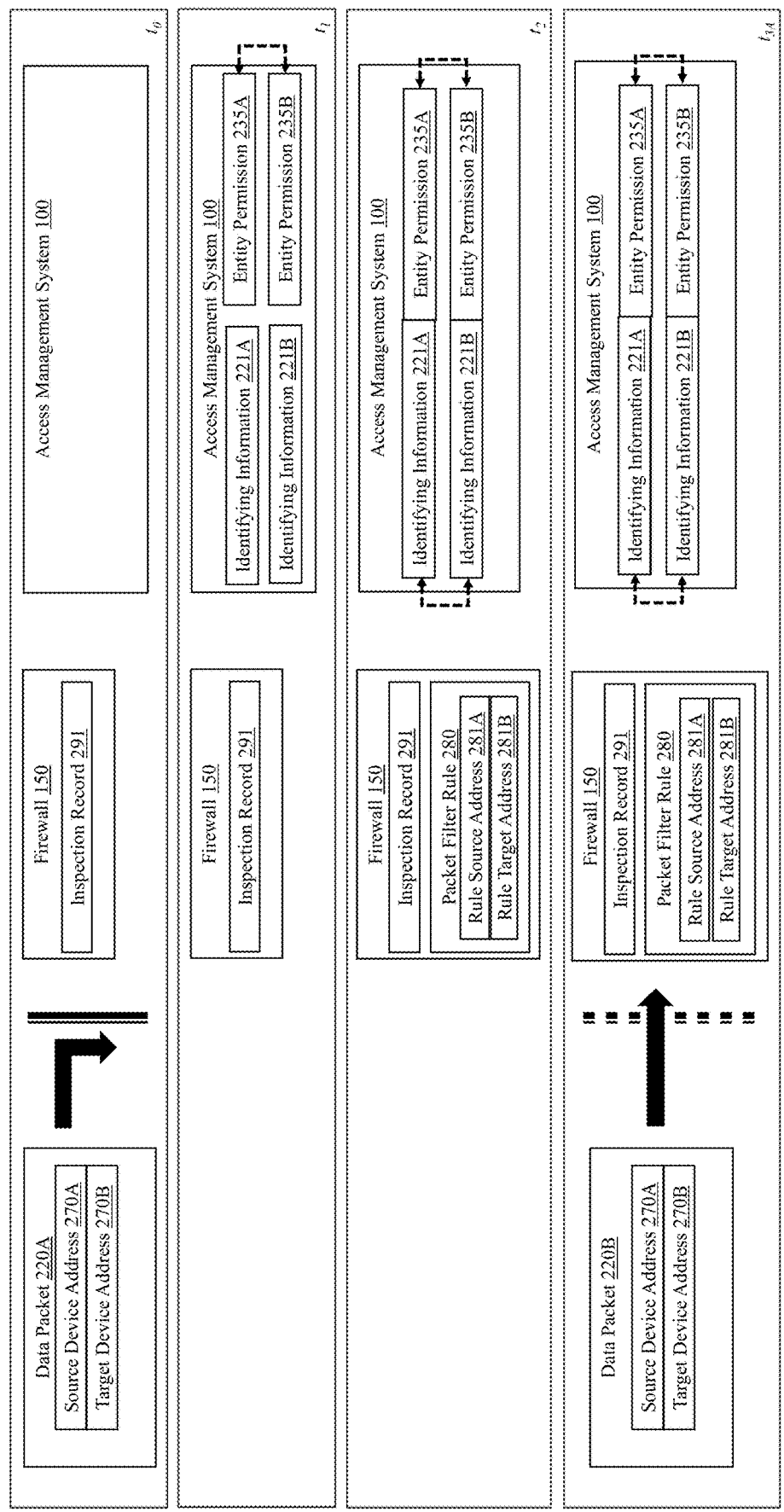
FIG. 4A illustrates a time series flow of a data packet being rejected by a firewall, an exemplar access management system reviewing the rejection record, ascertaining a new packet filter rule is required, and a subsequent data packet being allowed by the firewall.

FIG. 4A illustrates a time series flow of a data packet 220A being rejected by a firewall 250, an exemplar access management system 100 reviewing the rejection record, ascertaining a new packet filter rule 280 is required, and a subsequent data packet 220B being allowed by the firewall 250.

At $t_0$, a data packet 220A arrives at firewall 250, with a source asset address 270A and a target asset address 270B. The firewall 250 includes no packet filter rule 280 relevant to the source asset address 270A and target asset address 270B pair. As the firewall 250 has no relevant packet filter rule, the firewall 250 blocks the data packet 220A, and creates an inspection record 291 of the event.

At $t_1$, the access management system 100 reviews the inspection record 291 and retrieves information on the identifying information 221A-B from the asset hierarchy system 180, and has linked information for the entity permission pairs 235A-B from the hierarchy permission system 190, but does not have a linkage between the identifying information 221A-B and the entity permissions 235A-B, or between the identifying information 221A-B themselves.

At $t_2$ the access management system 100, using the methods disclosed above, ultimately links identifying information 221A to entity permission 235A, and links identifying information 221A to entity permission 235B. Entity permission 235A-B are previously linked, generally by an arbiter device 160. Identifying information 221A is therefore linked to identifying information 221B through the linked entity permissions 235A-B. Linked identifying information 221A-B is then returned to the firewall 250, resulting in a packet filter rule 280 with a rule source address 281A matching identifying information 221A, and rule target address 281B matching identifying information 221B.

Later at $t_{3,4}$, data packet 220B, which has the same source asset address 270A and target asset address 270B as data packet 220A, and may be a substantive copy of data packet 220A, arrives at the firewall 250. The firewall 250, equipped with an appropriate packet filter rule 280 (i.e., a packet filter rule 280 where source asset address 270A matches rule source address 281A and target asset address 270B matches target source address 281B), then executes the processing rule added to the packet filter rule 280 by entity permissions 235A-B. In this example, the rule instructs the firewall 250 to allow the traffic. Consequently, firewall 250 adheres to the packet filter rule 280 and allows data packet 220B to proceed to target asset at target asset address 270B.

Figure 4B:
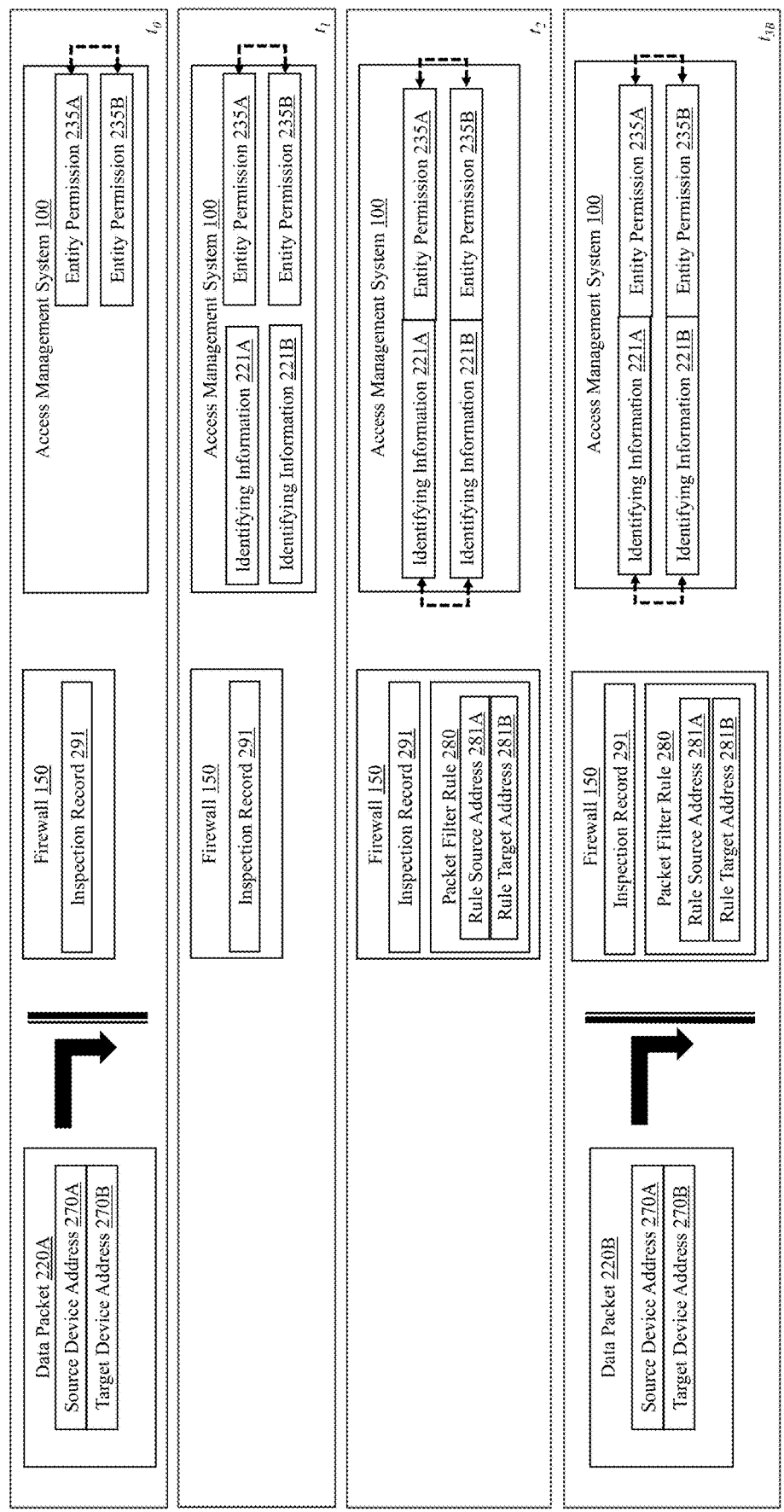
FIG. 4B illustrates a time series flow of a data packet being rejected by a firewall, an exemplar access management system reviewing the rejection record, ascertaining a new packet filter rule is required, and a subsequent data packet also being rejected by the firewall.

FIG. 4B illustrates a time series flow of a data packet 220A being rejected by a firewall 250, an exemplar access management system 100 reviewing the rejection record, ascertaining a new packet filter rule 280 is required, and a subsequent data packet 220B also being rejected by the firewall 250. The time series of FIG. 4B is substantially similar to the time series of FIG. 4A, excepting that the events at $t_{3A}$ are exchanged for the events at $t_{3B}$.

At $t_{3B}$, data packet 220B, which has the same source asset address 270A and target asset address 270B as data packet 220A, and may be a substantive copy of data packet 220A, arrives at the firewall 250. The firewall 250, equipped with an appropriate packet filter rule 280 (i.e., a packet filter rule 280 where source asset address 270A matches rule source address 281A and target asset address 270B matches target source address 281B), then executes the processing rule added to the packet filter rule 280 by entity permissions 235A-B. In this example, the rule instructs the firewall 250 to block the traffic. Consequently, firewall 250 adheres to the packet filter rule 280 and prevents data packet 220B from proceeding to target asset at target asset address 270B.

4. Example Processes

Figure 5:
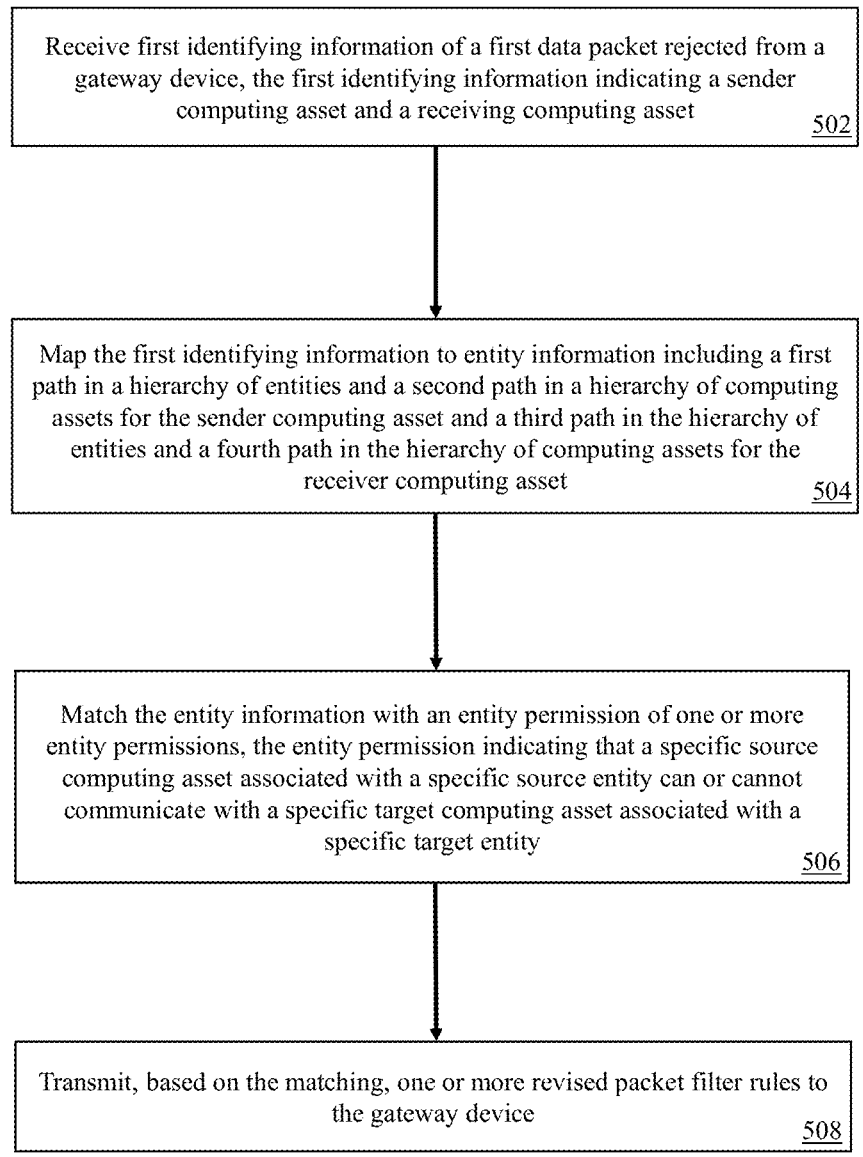
FIG. 5 illustrates an example process of dynamically managing network traffic with granular security zones performed by the access management system.

FIG. 5 illustrates an example process of dynamically managing network traffic with granular security zones performed by the access management system 100. Each of FIGS. 3A and 5 is shown in simplified, schematic format for purposes of illustrating a clear example and other embodiments may include more, fewer, or different elements connected in various manners. Each of FIGS. 3A and 5 is intended to disclose an algorithm, plan, or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In some embodiments, the access management system is programmed to receive a first data packet at a firewall, the first data packet including first identifying information compare the first identifying information to a first packet filter rule of one or more packet filter rules to produce a comparison outcome, and based on the comparison outcome, block the first data packet from reaching the receiver computing asset at the firewall.

In some embodiments, the access management system is programmed to parse an inspection record produced by the gateway device to obtain the first identifying information.

In some embodiments, in block 502, the access management system is programmed to receive first identifying information of a first data packet rejected from a gateway device. The first identifying information indicating a sender computing asset and a receiver computing asset.

In some embodiments, the first identifying information includes a first address of a sender device and a first port associated with the sender device or a second address of a receiver device and a second port associated with the receiver device. In some embodiments, the first identifying information of the first data packet rejected from the gateway device is received after a prior data packet is rejected from the gateway device. In some embodiments, the first identifying information of the first data packet matches prior identifying information of the second data packet.

In some embodiments, in block 504, the access management system is programmed to map the first identifying information to entity information including a first path in a hierarchy of entities and a second path in a hierarchy of computing assets for the sender computing asset and a third path in the hierarchy of entities and a fourth path in the hierarchy of computing assets for the receiver computing asset.

In some embodiments, a first respective target address associated with the entity information is non-consecutive with a second respective target address associated with the entity information.

In some embodiments, in block 506, the access management system is programmed to match the entity information with an entity permission of one or more entity permissions, each entity permission indicating that a specific source computing asset associated with a specific source entity can or cannot communicate with a specific target computing asset associated with a specific target entity.

In some embodiments, the access management system is programmed to match a first entity in the first path in the hierarchy of entities, and a second entity in the third path in the hierarchy of entities, to the entity permission based upon the specific source entity and the specific target entity. In certain embodiments, in the access management system is programmed to match a first computing asset in the second path in the hierarchy of computing assets, and a second computing asset in the fourth path in the hierarchy of computing assets, to the entity permission based upon the specific target computing asset and the specific target computing asset.

In some embodiments, in block 508, the access management system is programmed to transmit, based on the matching, one or more revised packet filter rules to the gateway device.

In some embodiments, the access management system is programmed to, based on an update to the entity information resulting in updated entity information, match the updated entity information with an alternative entity permission of one or more entity permissions, and based on the matching of the updated entity information with the alternative entity permission, update one or more updated packet filter rules of the one or more packet filter rules.

In some embodiments, the access management system is programmed to, based on the entity permission, forward the first identifying information and the first path, the second path, the third path, and the fourth path to an arbiter device of one or more arbiter devices.

In some embodiments, the access management system is programmed to, based on an instruction from the arbiter device, update the one or more entity permissions. In some embodiments, each entity permission is associated with a respective arbiter account of the one or more arbiter accounts.

In some embodiments, the access management system is programmed to update the one or more entity permissions based on a user input, or based on an instruction provided by a machine learning or artificial intelligence process.

In some embodiments, the access management system is programmed to receive a second data packet, the second data packet including second identifying information indicating the sender computing asset and the receiver computing asset.

In some embodiments, the access management system is programmed to compare the second identifying information to a second packet filter rule of the one or more packet filter rules, the second packet filter rule received among the one or more revising packet filter rules to produce a second comparison outcome.

In some embodiments, the access management system is programmed to, based on the second comparison outcome, forward the second data packet to the receiver computing asset. In some embodiments, the second data packet is a re-sent complete or substantial copy of the first data packet, and the second packet rule overrides, replaces, or updates the first packet filter rule

5. Example Implementation

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanism(s) for communicating information and/or instructions between the components of the computer system 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or other static storage device coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk, or optical disk such as CD-ROM or DVD-ROM, and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement Transmission Control Protocol/Internet Protocol (TCP/IP), Hypertext Transfer Protocol (HTTP) or other communication protocols; file processing instructions to interpret and render files coded using HTML, Extensible Markup Language (XML), Joint Photographic Experts Group (JPEG), Moving Picture Experts Group (MPEG) or Portable Network Graphics (PNG); user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computer system 600 may be coupled via I/O subsystem 602 to at least one output device 612. In one embodiment, output device 612 is a digital computer display. Examples of a display that may be used in various embodiments include a touch screen display or a light-emitting diode (LED) display or a liquid crystal display (LCD) or an e-paper display. Computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators, or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on the output device 612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 614 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware, and interfaces for generating position reporting packets, notifications, pulse or heartbeat signals, or other recurring data transmissions that specify a position of the computer system 600, alone or in combination with other application-specific data, directed toward host computer 624 or server 630.

Computer system 600 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to I/O subsystem 602. Communication interface 618 provides a two-way data communication coupling to network link(s) 620 that are directly or indirectly connected to at least one communication network, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a LAN, WAN, campus network, internetwork, or any combination thereof. Communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic, or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through a network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a world-wide packet data communication network represented as internet 628. A server 630 may be coupled to internet 628. Server 630 broadly represents any computer, data center, virtual machine, or virtual computing instance with or without a hypervisor, or computer executing a containerized program system such as DOCKER or KUBERNETES. Server 630 may represent an electronic digital service that is implemented using more than one computer or instance and that is accessed and used by transmitting web services requests, URL strings with parameters in HTTP payloads, application programming interface (API) calls, app services calls, or other service calls. Computer system 600 and server 630 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer and data storage layer such as a relational database system using structured query language (SQL) or NoSQL, an object store, a graph database, a flat file system or other data storage.

Computer system 600 can send messages and receive data and instructions, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage 610, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

6. Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method of dynamically managing network traffic with granular security zones, comprising:

receiving a first data packet from a user device, the first data packet including first identifying information indicating a sender computing asset and a receiver computing asset, each of the sender computing asset and the receiver computing asset including a computer resource in a computer network;

comparing the first identifying information to a first packet filter rule of a plurality of packet filter rules to produce a first comparison outcome;

based on the first comparison outcome, blocking the first data packet from reaching the receiver computing asset;

mapping, in response to the blocking, the first identifying information to entity information including a first path in a hierarchy of entities and a second path in a hierarchy of computing assets for the sender computing asset and a third path in the hierarchy of entities and a fourth path in the hierarchy of computing assets for the receiver computing asset, each entity in the hierarchy of entities corresponding to a group of account identifiers;

matching the entity information with an entity permission of one or more entity permissions, each entity permission indicating that a specific source computing asset in the hierarchy of computing assets associated with a specific source entity in the hierarchy of entities can or cannot communicate with a specific target computing asset in the hierarchy of computing assets associated with a specific target entity in the hierarchy of entities; and updating based on the matching, one or more packet filter rules of the plurality of packet filter rules, wherein the method is performed by one or more processors.

2. The method of claim 1, further comprising:

receiving a second data packet from the user device, the second data packet including second identifying information indicating the sender computing asset and the receiver computing asset, comparing the second identifying information to a revised packet filter rule of the one or more packet filter rules, to produce a second comparison outcome; and based on the second comparison outcome, forwarding the second data packet to the receiver computing asset.

3. The method of claim 2, wherein:

the second data packet is a re-sent complete or substantial copy of the first data packet; and the revised packet filter rule overrides, replaces, or updates the first packet filter rule.

4. A method of dynamically managing network traffic with granular security zones, comprising:

receiving first identifying information of a first data packet rejected from a gateway device, the first identifying information indicating a sender computing asset and a receiver computing asset;

mapping the first identifying information to entity information including a first path in a hierarchy of entities and a second path in a hierarchy of computing assets for the sender computing asset and a third path in the hierarchy of entities and a fourth path in the hierarchy of computing assets for the receiver computing asset;

matching the entity information with an entity permission of one or more entity permissions, the entity permission indicating that a specific source computing asset associated with a specific source entity can or cannot communicate with a specific target computing asset associated with a specific target entity; and based on the matching, transmitting one or more revising packet filter rules to the gateway device, wherein the method is performed by one or more processors.

5. The method of claim 4, the matching comprising:

comparing a first entity in the first path in the hierarchy of entities, and a second entity in the third path in the hierarchy of entities, to the entity permission based upon the specific source entity and the specific target entity.

6. The method of claim 4, the matching comprising:

comparing a first computing asset in the second path in the hierarchy of computing assets, and a second computing asset in the fourth path in the hierarchy of computing assets, to the entity permission based upon the specific source computing asset and the specific target computing asset.

7. The method of claim 4, wherein:

the first identifying information includes a sender address, the gateway device rejected the first data packet based on a first packet filter rule of a plurality of packet filter rules, and the first packet filter rule includes a rule source address and a rule target address.

8. The method of claim 7, further comprising:

parsing an inspection record produced by the gateway device to obtain the first identifying information.

9. The method of claim 8, further comprising:

receiving the first data packet at a firewall, the first data packet including the first identifying information;

at the firewall, comparing the first identifying information to a first packet filter rule of one or more packet filter rules to produce a comparison outcome; and based on the comparison outcome, blocking the first data packet from reaching the receiver computing asset at the firewall.

10. The method of claim 9, further comprising:

receiving a second data packet, the second data packet including second identifying information indicating the sender computing asset and the receiver computing asset;

comparing the second identifying information to a second packet filter rule of the one or more packet filter rules, the second packet filter rule received among the one or more revising packet filter rules to produce a second comparison outcome; and based on the second comparison outcome, forwarding the second data packet to the receiver computing asset.

11. The method of claim 10, wherein:

the second data packet is a re-sent complete or substantial copy of the first data packet; and the second packet filter rule overrides, replaces, or updates the first packet filter rule.

12. The method of claim 4, further comprising:

based on the entity permission, forwarding the first identifying information and the first path, the second path, the third path, and the fourth path to an arbiter device of one or more arbiter devices; and based on an instruction from the arbiter device, updating the one or more entity permissions.

13. The method of claim 4, further comprising updating the one or more entity permissions based on a user input, or based on an instruction provided by a machine learning or artificial intelligence process.

14. The method of claim 4, wherein each entity permission is associated with a respective arbiter account of one or more arbiter accounts.

15. The method of claim 4, wherein the first identifying information includes a first address of a sender device and a first port associated with the sender device or a second address of a receiver device and a second port associated with the receiver device.

16. The method of claim 4, further comprising:

based on an update to the entity information resulting in updated entity information, matching the updated entity information with an alternative entity permission of one or more entity permissions; and based on the matching of the updated entity information with the alternative entity permission, updating one or more updated packet filter rules of one or more packet filter rules.

17. The method of claim 4, wherein a first respective target address associated with the entity information is non-consecutive with a second respective target address associated with the entity information.

18. The method of claim 4, wherein the first identifying information of the first data packet rejected from the gateway device is received after a prior data packet is rejected from the gateway device, and wherein the first identifying information of the first data packet matches prior identifying information of the prior data packet.

19. A non-transitory, computer-readable storage medium storing one or more sequences of instructions which when executed cause one or more processors to perform:
- receiving a first data packet from a user device, the first data packet including first identifying information indicating a sender computing asset and a receiver computing asset,
- each of the sender computing asset and the receiver computing asset including a computer resource in a computer network;
- comparing the first identifying information to a first packet filter rule of a plurality of packet filter rules to produce a first comparison outcome;
- based on the first comparison outcome, blocking the first data packet from reaching the receiver computing asset;
- mapping, in response to the blocking, the first identifying information to entity information including a first path in a hierarchy of entities and a second path in a hierarchy of computing assets for the sender computing asset and a third path in the hierarchy of entities and a fourth path in the hierarchy of computing assets for the receiver computing asset,
- each entity in the hierarchy of entities corresponding to a group of account identifiers;
- matching the entity information with an entity permission of one or more entity permissions, each entity permission indicating that a specific source computing asset in the hierarchy of computing assets associated with a specific source entity in the hierarchy of entities can or cannot communicate with a specific target computing asset in the hierarchy of computing assets associated with a specific target entity in the hierarchy of entities; and
- updating based on the matching, one or more packet filter rules of the plurality of packet filter rules.

20. The non-transitory, computer-readable storage medium of claim 19, the one or more sequences of instructions when executed causing the one or more processors to further perform:
- receiving a second data packet from the user device, the second data packet including second identifying information indicating the sender computing asset and the receiver computing asset,
- comparing the second identifying information to a revised packet filter rule of the one or more packet filter rules, to produce a second comparison outcome; and
- based on the second comparison outcome, forwarding the second data packet to the receiver computing asset.

* * * * *